C. T. RAY.
PLANTER.
APPLICATION FILED FEB. 25, 1911.
1,171,882.
Patented Feb. 15, 1916.
2 SHEETS—SHEET 2.
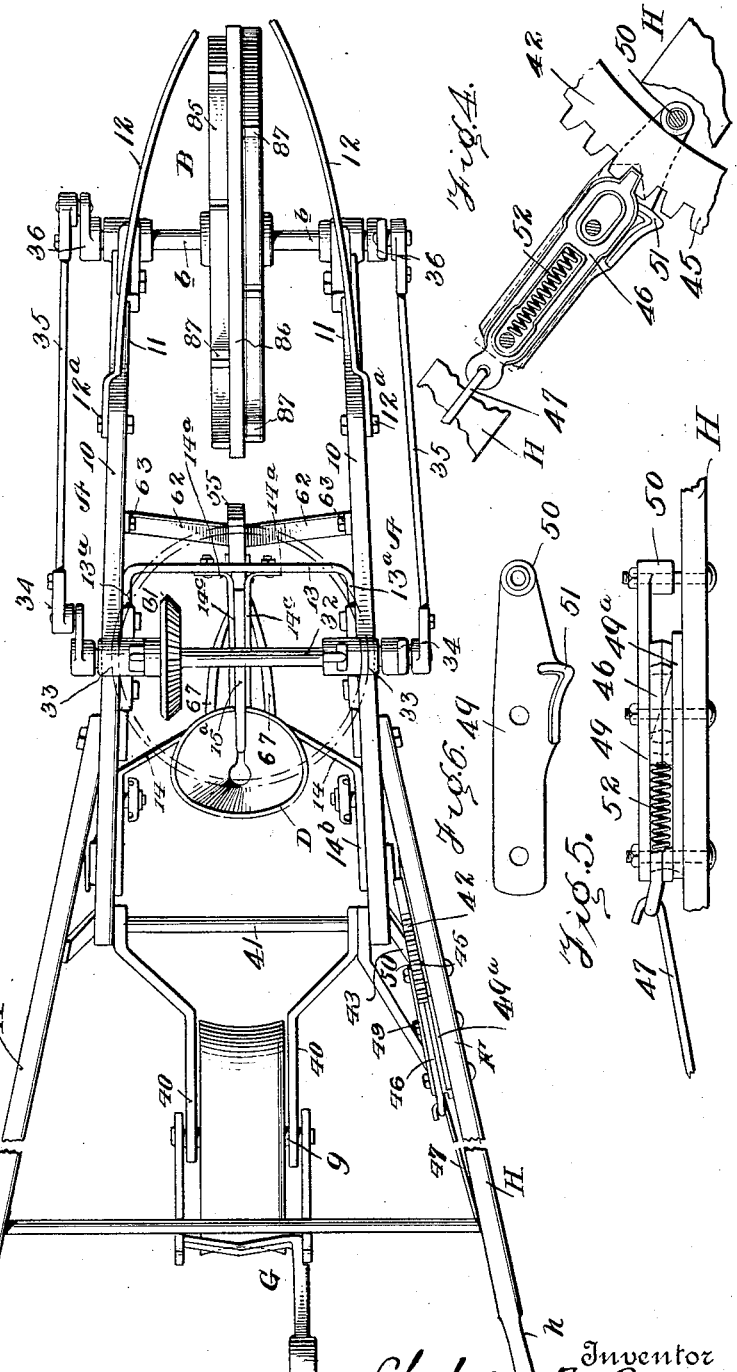
Witnesses
Helgett Murray
A. Stockman
Inventor
Charles T. Ray
By C. J. Stockman
Attorney

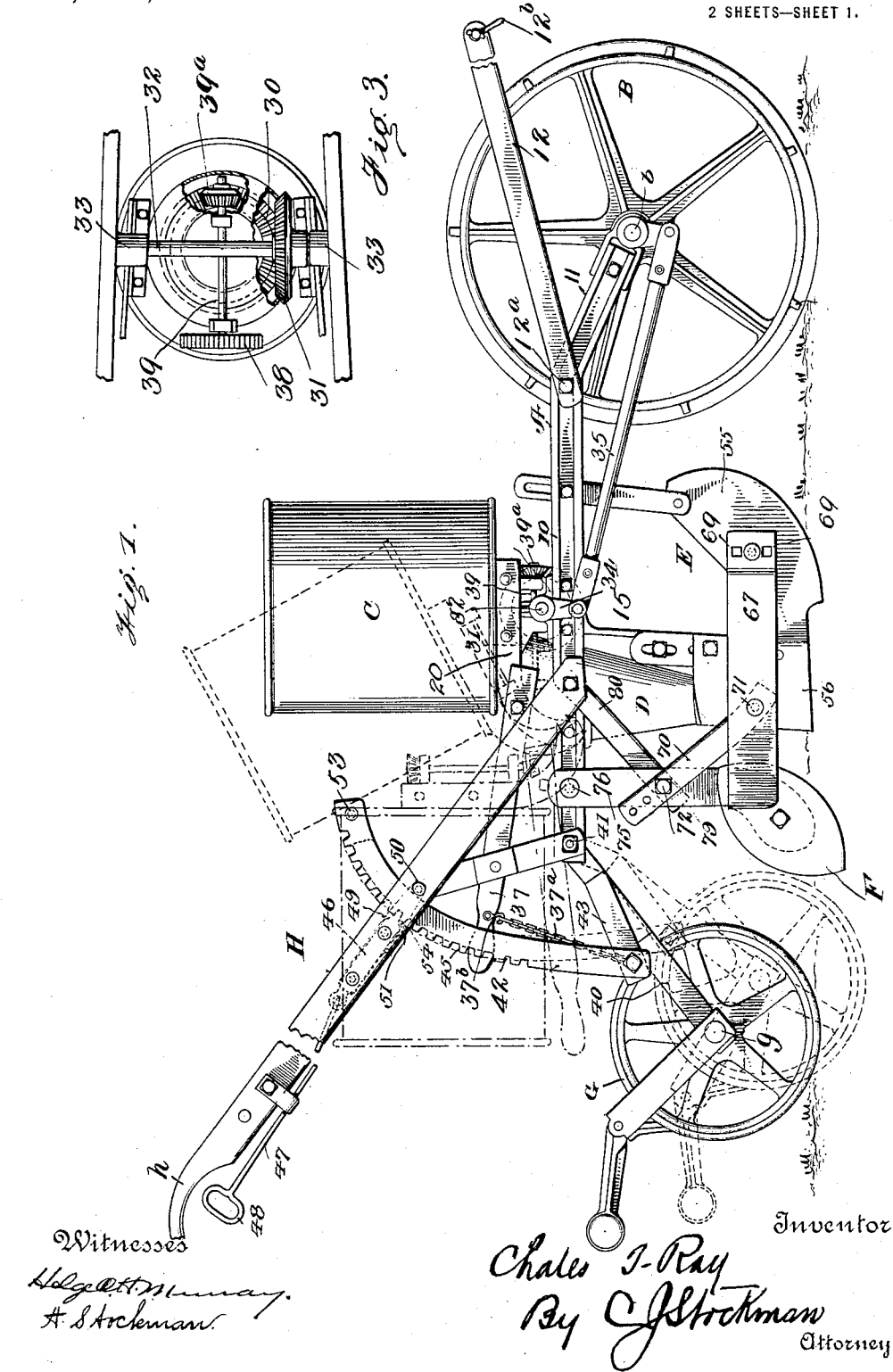

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER.

1,171,882.  Specification of Letters Patent.  Patented Feb. 15, 1916.

Application filed February 25, 1911. Serial No. 610,722.

*To all whom it may concern:*

Be it known that I, CHARLES T. RAY, a citizen of the United States, residing at Louisville, in the county of Jefferson and State of Kentucky, have invented new and useful Improvements in Planters, of which the following is a specification.

This invention has reference to a farm implement—such as a seed planter, for example—provided with means for delivering seed or other matter in an orderly manner to the ground and with means for adjustably regulating the height of the frame and automatically stopping the discharge of the matter which is distributed by the implement when the frame has been adjusted to a predetermined height.

The invention more particularly relates to a farm implement comprising a frame, supporting wheels for opposite ends of the frame; dropping means for controlling the discharge of the seeds or other matter which is to be distributed by the implement, said means being arranged to be driven from one of the supporting means and having disconnectible elements whose disengagement from each other causes the discharge of the matter to cease; and a carrier for the other supporting wheel, the said carrier being pivoted to the frame of the implement and depending therefrom and adjustable to various angular positions wherein it supports the adjacent end of the frame at correspondingly different heights from the said wheel, the carrier being also associated with a means for releasing it from and locking it in its different positions of adjustment and with means for automatically disengaging the disconnectible elements of the dropping means from each other when the frame has been adjusted to a predetermined height: it being one of the most important purposes of the present invention to correlate the parts hereinbefore mentioned so that the frame may be most conveniently adjusted to and effectively held at different selected heights from the ground and will be supported at all of said heights at both its front and rear ends by the supporting wheels, the adjustments to certain heights—which define the working limits of the implement, for example—being accomplished without interfering with the discharge of the matter which is being distributed by the implement, while adjustment of the frame to a height above those last mentioned—to a transport position, for example—will automatically stop the discharge of the matter.

Other objects and important advantages of the invention will appear from the hereinafter description, taken in connection with the accompanying drawings, wherein:

Figure 1 is a side elevation of a planter embodying all of the several improvements hereinbefore referred to. Fig. 2 is a plan view of the planter, with the hopper removed and part of the draft bars broken off. Fig. 3 is an inverted view, partly broken away, illustrating the driving connections for the seed feeding means in and upon the hopper. Fig. 4 is a detail side view of the locking means for the rear or press wheel, the handle of the planter being broken away and the inner casing plate removed. Fig. 5 is a plan view of said locking means: and Fig. 6 is a detail view of the cover plate thereof.

The features constituting the present invention are preferably embodied in a walking planter having a suitable frame A, a front wheel B, a pivoted seed hopper C, a suitable seed chute D, a suitable furrow opener E, a suitable seed coverer F, a rear supporting wheel G formed to adapt it to serve also as a press wheel, and handles H H: and for this reason I have exemplified the invention as being embodied in a walking planter of this particular character. It is to be understood, however, that the invention may be otherwise and variously embodied and that changes may be made in the details of the herein-exemplified form of the invention, without departing from the spirit of the invention or the scope of subjoined claims. I would have it understood also that I consider the detail embodiment illustrated in the accompanying drawings to be a particularly advantageous one and for this reason have made certain claims which particularly define the same. In short, while the invention presents certain matter of broad novelty the particular embodiment herein illustrated further presents matter of particular novelty, and having particular important advantages, which will be apparent to those familiar with farm implements for discharging seeds or other matter to the ground; and hence the invention is claimed both broadly and specifically.

The frame comprises two longitudinal members 10, 10 which are preferably formed of I-bars, as shown, but they may be of other channel or flanged bars, or of straps or plane-bar form, if desired. Bearings for the axle $b$ of the front wheel B are provided in frame-members, marked 11, 11, which depend from the members 10, 10 and are exemplified as being integral with the latter. The members 10 are provided with forwardly-converging draft-bars 12, 12 pivoted thereto at their rear ends $12^a$ and provided with a draft eye $12^b$ at their front ends.

A pair of arms 20 are suitably secured to the hopper C. These arms extend downward and rearward from the hopper and are pivotally mounted in any suitable way upon the frame of the implement, so that the hopper may be tilted rearward to an approximately horizontal position as shown by the dot-and-dash lines in Fig. 1, where it may be most conveniently and effectually cleaned and will freely expose the gears for oiling and other purposes; or to an intermediate position, as shown by the broken lines in said figure, to disconnect the seed dropping mechanism and thereby stop the flow of seed.

The seed dropping mechanism comprises at the outlet from the hopper a plate or plates, or cone, or other usual or suitable means, which being of any approved character and well known need not be disclosed herein. The operating means coöperating therewith to control the flow of seed therefrom, preferably comprises a crown gear 30 carried by the hopper and driven by a gear 31 which is exemplified as being fixed on a shaft 32 which is mounted in bearings 33 carried by the frame-members 10. This shaft is shown as deriving its motion from the axle $b$ through the medium of cranks 34, pitmen 35 and cranks 36. Obviously when the hopper is lifted pivotally to its intermediate position shown by the broken lines in Fig. 1, gears 30 and 31 are disconnected from each other and the feeding stops. This adjustment of the hopper may be accomplished manually at any position of the frame, to facilitate which a lever 37 extends from one of the arms 20 to a place within convenient reach of the user. It is one of the important purposes of the present invention, however, to provide means wherein the flow of seeds or other material whose discharge is controlled by the dropping mechanism may be automatically stopped when the frame has been adjusted to a predetermined height—such as a transport position, for example—the preferred means for the accomplishment of such purpose being hereinafter particularly set forth.

38 designates a wheel which preferably is employed as a part of the seed dropping mechanism. This wheel is exemplified as mounted on a shaft 39 provided with a gear $39^a$ through which it derives motion from the crown gear 30.

The rear wheel G is supported by a carrier which is fulcrumed to the frame of the planter so as to be adjustable to regulate the height of the frame, and is held in its adjusted positions so as to support the frame from the rear wheel at correspondingly different heights by means of relatively movable interengaging members, one of which has an actuating element so disposed with relation to the handle H that the user may, with the one hand and at the same time, release it from the other member and raise or lower the handle, whereupon the carrier will automatically assume a position at a different angle from that previously occupied by it with respect to the frame. The illustrated means embodying these important characteristics, comprise a pair of arms, marked 40, 40, whose upper ends are pivoted on a shaft 41 which extends across the frame of the planter, at the rear end of the latter, and whose lower ends are provided with bearings for the axle $g$ of the wheel G: and a pivotally supported rack bar or segment, marked 42, which is shown as carried by an arm 43 secured to the adjacent arm 40. This rack bar or segment extends upward from its carrier 43 and its arcuate surface is provided with rearwardly extending teeth 45. These teeth are severally engaged by a slidable pawl 46 which is provided with an actuating rod 47 having a handle 48 adjacent to the gripping portion $h$ of the handle H. The pawl is mounted in suitable relation to a guide or retainer which is secured to the handle H. This guide or retainer is shown as comprising plates 49 and $49^a$ between which the pawl is slidably mounted. One of these plates, as 49, is provided with projections 50 and 51 which are spaced apart to receive the rack bar between them and to hold said bar in position to be engaged by said pawl. The pawl is provided with a spring, as indicated at 52, for pressing it into engagement with the adjacent tooth of the rack bar after adjustment. A projection 53 from the upper end of the rack bar serves as a stop to prevent said bar from falling from the handle when the handles have been lifted to the extreme position of adjustment.

It will be noted that the described correlation of the parts is such that the operator may simultaneously withdraw the pawl from engagement with the rack bar and raise or lower the frame by raising or lowering the handles: and that when he raises the frame the wheel carrier is caused to move to a more nearly vertical position, in which it is locked by reëngagement of the pawl with the rack bar, thereby maintaining the frame in its new position for shallower planting than before; and, similarly, that when he presses downward upon the handles, after releasing the rack bar, the pressure of the ground transmitted to the wheel-carrier, through the wheel G, causes said carrier to assume a position at a greater inclination than before, and thus lowers the frame, for deeper planting than before, the parts being locked as before described when the frame has been lowered the desired extent. The adjustment of the planter for planting a predetermined depth is thereby greatly facilitated. Moreover, by raising the frame and engaging the pawl in the end notch of the rack bar, for example, the furrow opener E and closer F will be sufficiently elevated to be clear of the ground, which is of great convenience in transporting the planter from field to field, for example, as it will then travel on the front and rear wheels without being interfered with by the furrow opener or closer.

As already stated provision is made for automatically stopping the flow of seed when the frame reaches its transporting position. This is accomplished by disconnecting elements of the seed dropping mechanism from each other when the frame has attained a certain height. In the present exemplification of the invention, the hopper C being pivoted and carrying a part of the seed dropping mechanism, it is preferable to connect the hopper with a part which moves with the rear wheel G, by a means which automatically raises the hopper pivotally, and thereby disconects the gears 30 and 31 from each other, when the wheel has reached a position at which it sustains the frame in transporting position, there being preferably different working positions provided for by adjustment of said wheel, at which the hopper is not affected by such adjustment. The preferred means, herein shown, consists of a flexible connector, as a chain 37ª, having one end connected to the lever 37, preferably by an open link 37ᵇ, while its other end is attached to an appropriate part of the carrier. The length of this connector is so adjusted as to provide sufficient slack to cause it to disengage the gears by its pull on the hopper only when the carrier has reached the position which it assumes when the parts are in transporting position, the positions assumed by said carrier in the adjustments of the frame for depth of planting being such as merely to slacken the connector or take up slack therein.

The furrow opener E preferably comprises the blade or cutting portion 55 and diverging wings 56. It is suitably suspended from the frame of the planter, preferably by a means which permits it to be adjusted relatively to said frame, to cause it to operate more or less below the plane of the frame.

67 designates scrapers which serve to level the top of the row or bed and to sweep trash therefrom. They extend convergently forward and their front ends are suitably secured to the opener E, at opposite sides of the latter, preferably adjustably. The rear portions of the scrapers are suspended, by arms 70 connected thereto at 71, from standards 75 which support the coverer blades F, herein shown as being of the spoon type. The standards 75 extend from the frame members 10, to which they are suitably connected as indicated at 76, and they are braced by inclined arms, 80, which also extend from said frame members and are secured to the standards, preferably by bolts 72, which bolts also secure the arms 70 to the standards 75.

The construction described provides a very desirable means, whose details may, however, be varied within wide limits without departing from the spirit of the invention, by which the furrow is opened and retained in open position, until after the seed is deposited, and by which the seed is protected against being dissipated by the wind, and by which the opener may be set in a number of different positions with respect to the frame and is fixedly held in its adjusted position. It will be understood that after the opener is set in a predetermined position with respect to the frame, the further adjustment of the planter for deeper or shallower planting is accomplished by the adjustment of the rear wheel G.

Reference is hereby made to the following applications for Letters Patent of the United States which have been filed by me as divisions of the present application and which respectively show, describe and claim matter shown and described but not generically claimed herein, to wit: Serial Number 663,130 filed November 29, 1911, Serial Number 663,133 filed November 29, 1911, Serial No. 834,810 filed April 27, 1914 and Serial Number 835,009 filed April 28, 1914.

Having now described the invention what I believe to be new and desire to secure by Letters Patent, is:—

1. In a seed distributer, a frame, supporting wheels for opposite ends of the frame, one of said supporting wheels having a carrier which is adjustably connected to the frame and is arranged to support the adjacent end of the same from said wheel at different selected heights, mechanism for the discharge of the matter which is to be distributed by the implement, means operated by the other supporting wheel for operating said mechanism, said mechanism including elements which are disconnectible from each other to stop the discharge of the matter, means for automatically disconnecting said elements from each other when the frame has been adjusted to a predetermined height, and means for locking the carrier of the first mentioned wheel in its different selected positions.

2. In a seed distributer, a frame having a handle, a supporting wheel for one end of the frame, a supporting means for the other end of the frame, the latter supporting means being arranged to adjust itself automatically when the adjacent end of the frame is raised or lowered and having relatively adjustable elements coöperating to lock it in its different positions and thereby cause the frame to be supported at different heights by the wheel and second supporting means, one of said elements being movable with the second supporting means and the other being releasable therefrom and engageable therewith and having means adjacent to the grip portion of the handle for adjusting it to and from its locking position, mechanism for the discharge of the matter which is to be distributed by the implement, said mechanism including elements which are disconnectible from each other to stop the discharge of the matter, and connections between one of the latter elements and the second supporting means, arranged to cause said elements to be disconnected from each other when the frame has been adjusted to a certain height from the ground.

3. In a seed distributer, a frame, supporting wheels for opposite ends of the frame, a carrier for one of said supporting wheels, said carrier having its upper end pivotally connected to the frame, and being adjustable to different angles with relation thereto and supporting the frame at different heights from said wheel, a rack and a latch coöperating to lock the carrier in different positions of adjustment, mechanism for the discharge of the matter which is to be distributed by the implement, means operated by the other supporting wheel for operating said mechanism, said mechanism including elements which are disconnectible from each other to stop the discharge of the matter and means connected to said carrier for disconnecting said elements from each other when the frame has been adjusted to a predetermined height.

4. In an implement of the kind described, a frame, supporting wheels for opposite ends of the frame, a carrier for one of the supporting wheels, said carrier having its upper end pivotally connected to the frame and being adjustable to different angles with relation thereto and supporting the frame at different heights from said wheel, a rack and a latch coöperating to lock the carrier in different positions of adjustment, a hopper pivotally connected to the frame, dropping mechanism including gears which are disconnected from each other to stop the discharge of matter when the hopper is raised, means connecting the hopper with the carrier for raising the former automatically when the carrier has been adjusted to a predetermined position, and means for operating the dropping mechanism from the other supporting wheel.

5. In an implement of the kind described, a frame having a handle at one end, supporting wheels for opposite ends of the frame, a carrier for one of the supporting wheels, said carrier having its upper end pivotally connected to the frame and being adjustable to different angles with relation thereto and supporting the frame at different heights from said wheel, a rack and latch mechanism, one member of which is connected to the carrier and the other arranged adjacent to the handle, said mechanism operating to lock the carrier in different positions of adjustment, a hopper pivotally connected to the frame, dropping mechanism including gears which are disconnectible from each other to stop the discharge of matter when the hopper is raised, means connecting the hopper with the carrier for raising the former automatically when the carrier has been adjusted to a predetermined position, and means for operating the dropping mechanism from the other supporting wheel.

6. In a planter, the combination with a frame, supporting a traction wheel and having handles, a seed box and a seed dropping mechanism, and gearing between the traction wheel and seed dropping mechanism, of an adjustable presser wheel for supporting the frame in selected vertical adjustment, and connections whereby to disengage the said gearing when the frame is raised to an inoperative position including a quadrant having connection with the presser wheel and seed box, and a latch bar carried by the frame handles to engage the said quadrant.

7. In a planter, the combination with a frame supporting a traction wheel and having handles, a seed box hingedly mounted on the frame and a seed dropping mechanism, and gearing between the traction wheel and seed dropping mechanism, of an adjustable presser wheel for supporting the frame in selected vertical adjustment, and connections whereby to swing the seed box and disengage the said gearing when the frame is raised to an inoperative position including a quadrant having connection with the presser wheel and seed box, and a latch bar carried by the frame handles to engage the said quadrant.

8. In a planter, the combination with a frame having a forward traction wheel, of a rear presser wheel, forks supporting said presser wheel and pivotally connected to the rear portion of the frame, a quadrant secured to and movable with the presser wheel forks, handles rigidly conected to the frame and extending rearwardly therefrom, a seed box and seed dropping mechanism having detachable connection with the traction wheel, a lever connection between the said quadrant and the seed box and a latch mechanism carried by the handles and engaging the quadrant whereby to support the wheel and forks in various degrees of angularity with respect to the frame.

9. In a machine of the kind described, a frame having a handle, means for supporting the frame at different heights, said supporting means comprising a wheel, a carrier for the wheel and a locking means for the carrier, the carrier being pivotally suspended from the frame and adapted to be turned when the frame is raised or lowered and the locking means comprising a rack movable with the carrier and a pawl carried by the handle and adapted to engage any of the teeth of the rack, combined with a hopper pivotally mounted on the frame, mechanism for controlling the flow of material from said hopper, said mechanism comprising a driving means one of the elements of which is mounted to move with the hopper, and a connection between the hopper and the frame-supporting means adapted to move the hopper and thereby disconnect the elements of said driving means from each other when the frame-supporting means has reached a predetermined place in its adjustment.

10. In a machine of the kind described, a frame having a handle, means for supporting the frame at different heights, said supporting means comprising a wheel, a carrier for the wheel and a locking means for the carrier, the carrier being pivotally suspended from the frame and adapted to be turned when the frame is raised or lowered and the locking means comprising a rack movable with the carrier and a pawl carried by the handle and adapted to engage any of the teeth of the rack, combined with a hopper pivotally mounted on the frame, mechanism for controlling the flow of material from said hopper, said mechanism comprising a driving means one of the elements of which is mounted to move with the hopper, a rearward projection from said hopper and a flexible connector one of whose ends has connection with said rearward projection and the other of whose ends has connection with the carrier, said connector being of such length as to permit movement of the carrier relatively to the frame and hopper within certain limits and to become operative to move the hopper from said carrier when the carrier has been adjusted beyond said limit.

11. In a seed distributer, a frame having a handle, supporting wheels for opposite ends of the frame, a carrier for one of said wheels, the carrier being pivotally attached to the frame at its upper end, a locking means for the carrier comprising a latch and a rack, one of the parts of the locking means being movable with the carrier and the other part thereof having an operating element adjacent to the handle, mechanism for controlling the discharge of the matter which is to be distributed by the implement, said mechanism including elements which are disconnectible from each other to stop the discharge of the matter and a connection between one of said elements and the carrier operative to disengage said element from the other element when the carrier has reached a predetermined adjustment.

12. In an implement of the kind described, a frame having a handle, supporting wheels for opposite ends of the frame, a carrier for one of said wheels, the carrier being pivotally attached to the frame at its upper end, a locking means for the carrier comprising a latch and a rack, one of the parts of the locking means being movable with the carrier and the other part thereof having an operating element adjacent to the handle, a hopper pivotally mounted on the frame, mechanism for controlling the flow of material from the hopper, said mechanism comprising a driving means, one of the elements of which is adjustable with the hopper, and a loose connection between the hopper and the carrier, said loose connection being arranged to adjust the hopper and cause the discharge of matter to be stopped when the carrier has been adjusted to a transport position and said locking means being arranged to lock the carrier and its supporting wheel in said transport position and thereby enable the carrier and said wheel to support the adjacent end of the frame while in said position.

In testimony whereof I have hereunto set my hand in presence of two subscribing witnesses.

CHARLES T. RAY.

Witnesses:
J. FRED HARTKEMEIER, Jr.,
W. M. JOHNSTON.

Copies of this patent may be obtained for five cents each, by addressing the "Commissioner of Patents, Washington, D. C."